United States Patent Office 3,433,412
Patented Mar. 18, 1969

3,433,412
STEAM TRAP WITH RELIEF VALVE
Guy Breton, Montreal, Quebec, Canada, assignor to Velan Engineering Ltd., Montreal, Quebec, Canada
Filed Apr. 25, 1967, Ser. No. 633,600
Claims priority, application Canada, Apr. 22, 1967, 988,623
U.S. Cl. 236—59          8 Claims
Int. Cl. F16t 1/02, 1/04, 1/08

ABSTRACT OF THE DISCLOSURE

A steam trap having a main valve and temperature-actuated mechanism responsive to steam temperature to close this valve and to condensate temperature to open it and a pressure-actuated relief valve operating according to the Bernouilli effect, the main valve is closed to trap steam or open to pass condensate, as the case may be, so that condensate can start to escape before the temperature-actuated mechanism has had time to react to the change from steam to condensate.

This invention relates to improvements in steam traps.

Velan, United States Patent 2,629,553, February 24, 1953, is typical of steam traps which have been widely used and which have proven satisfactory. The present invention provides a trap of this type having increased sensitivity which reduces the lag in changeover from trapping steam to discharging condensate and vice versa.

This is accomplished according to the invention by a steam trap which has a main valve, and temperature-actuated mechanism responsive to steam temperature for closing the valve to trap steam and responsive to condensate temperature for opening the valve and allowing condensate to escape, and is provided, as well, with a relief valve operating independently of the main valve and immediately responsive to steam pressure to close the relief valve and conversely the absence of steam pressure to open the relief valve.

According to a preferred embodiment of the invention, the relief valve is embodied in the plug of the main valve. To this end, the main valve ball has a body provided with an upper spherical surface including a seating area adapted to seat against the main valve seat and a lower flat surface adapted to serve as a relief valve seat. An inlet passage extends from the surface of the ball normally inside the seating area, when the main valve is closed, to the flat surface. The ball is also provided with at least one discharge passage extending from the flat surface to the spherical surface at a point outside the seating area. The ball is provided with a cap or housing which encloses the flat surface and provides a chamber beneath it. The cap is provided with a pedestal extending upwardly in the center of the chamber. A disc normally sits on the pedestal, but is adapted to be lifted against the seating surface by the Bernouilli effect when steam is entering the inlet passage.

The main valve of the trap is held closed by the temperature responsive mechanism, when steam is entering the trap, and open when condensate is entering the trap. In the intermediate delay period before the opening of the main valve, steam is trapped or condensate allowed to escape, as the case may be, by the relief valve, so there is no delay in discharging condensate, which escapes as soon as it takes the place of steam entering the trap.

Figure 1:
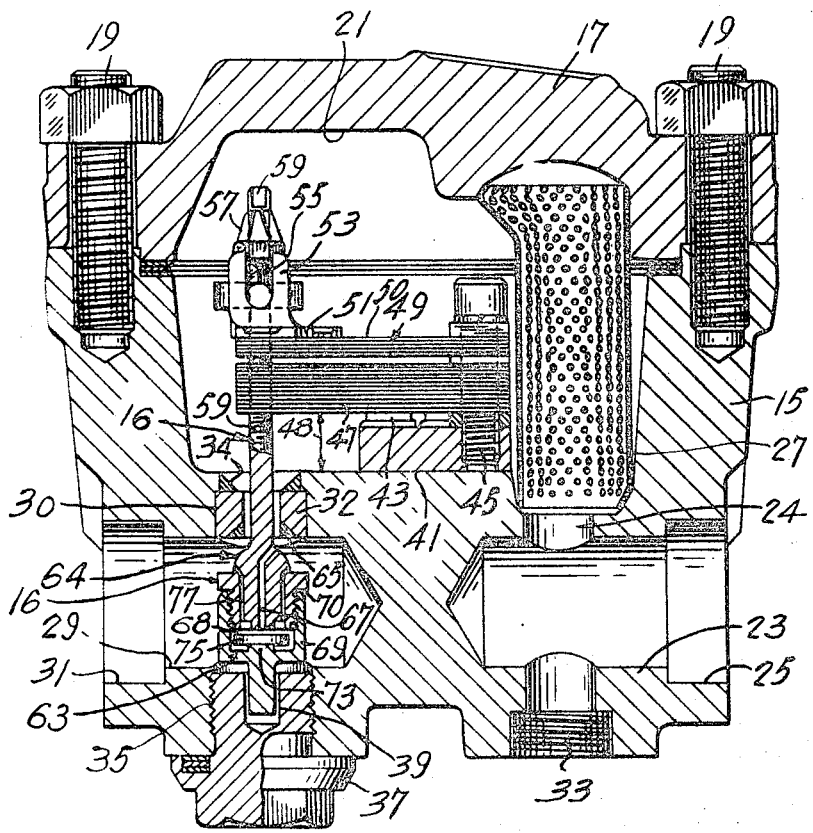
Figure 2:
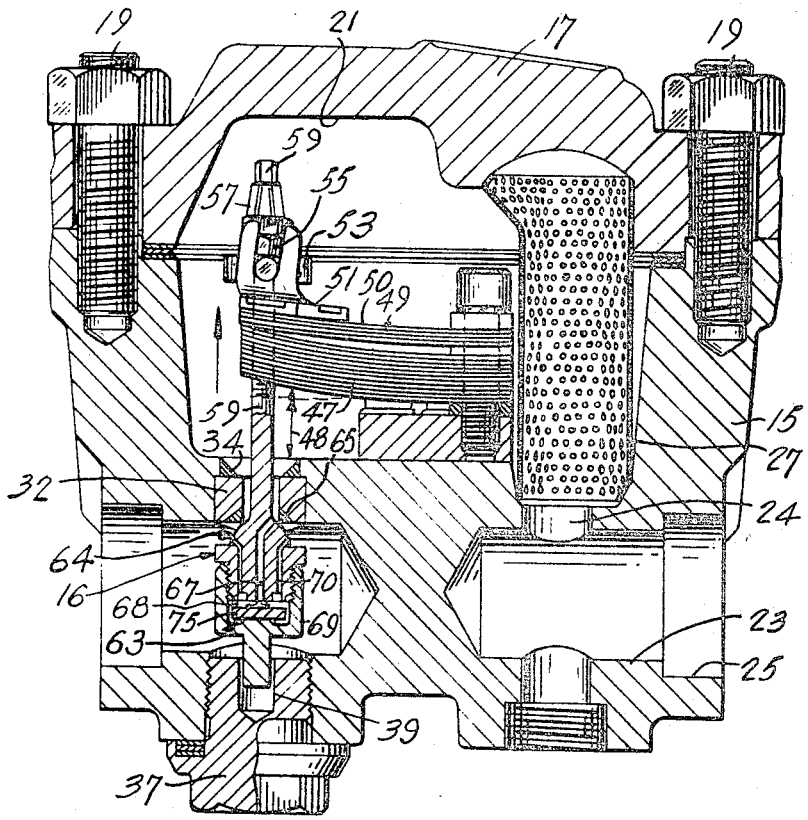
Figure 3:
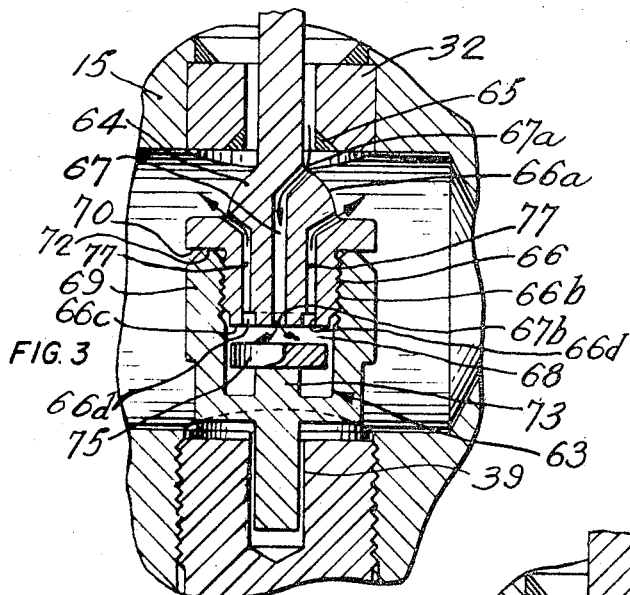
Figure 4:
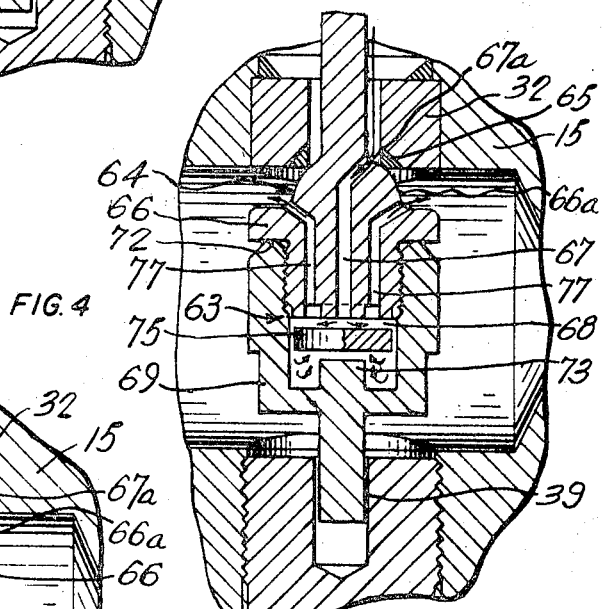
Figure 5:
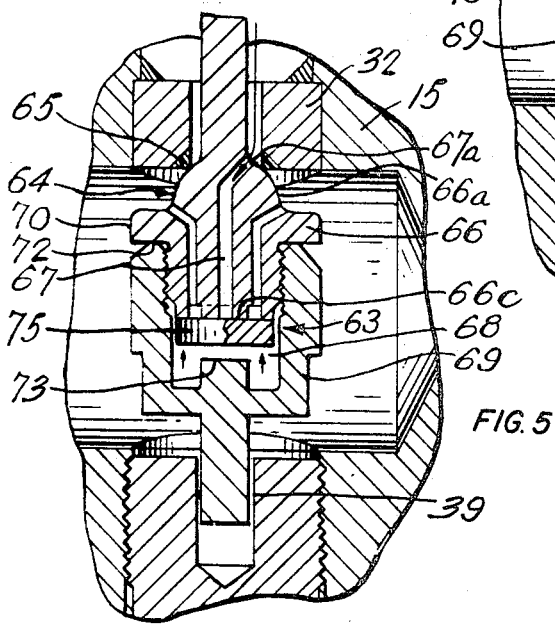

The invention has thus been generally described and it will now be referred to more specifically by reference to the accompanying drawings which illustrate a preferred steam trap according to the invention, and in which:

FIGURES 1 and 2 are vertical cross sections, partly in elevation, of the preferred steam trap with the main valve in open and closed positions respectively; and FIGURES 3, 4 and 5 are enlarged fragmentary views of detailed enlarged areas of FIGURES 1 and 2, showing the relief valve in the following respective positions: with the main valve open; with the main valve closed and with the relief valve about to close; and with the main valve closed and with the relief valve closed.

The preferred steam trap, as shown in FIGURES 1 and 2, has an appropriately constructed body 15 and cover 17 secured to it by bolts 19 to make up a composite housing. The body 15 and cover 17 have internal recesses providing in the housing, a chamber 21 accommodating the main valve 16.

The body 15 has an inlet bore 23 tapped or flanged at its outer end 25 for connection to a steam line. The bore 23 has an upward branch 24 leading to a recess at the side of the chamber 21 in which is mounted a strainer 27.

The body 15 also has, opposed to the inlet bore 23, an outlet bore forming a valve chamber 29, tapped or flanged at its outer end 31 to facilitate connection to a discharge line.

The body 15 also has a blow down discharge bore 33 provided where shown leading from the bore 23 to the outer surface of the body 15. The body 15 is also provided with a tapped bore 35 which accommodates a test plug 37 having at its inner end a guide recess 39. The body 15 defines a passage 30 communicating between the chambers 21 and 29. A sleeve 32 lines the bore 30 and is welded to it as at 34.

Within the chamber 21 is a known bimetallic mechanism for operating the main valve 16 of the steam trap as will be understood from the above-mentioned Velan patent and other patents to him. This mechanism is briefly as follows: screwed to the body at the base of this chamber with screws 43 is a bimetal holder 41; a pedestal 45 is screwed to the base 41. The pedestal 45 carries the bimetallic segment units 47 and 49. The unit 49 has a stainless steel top plate 50. On the top plate 50 is tack-welded a bridge 51, which in turn carries a rocker 53. An adjusting nut 55 and a self-locking nut 57 are internally threaded and mounted on the threaded end of a valve stem 59 which extend downwardly through a slot in the bimetallic element units 47, 49 and through the sleeve 32 into the valve chamber 29. The valve stem 59 carries a main valve ball indicated generally by 64 and specifically constructed, according to the invention, to include a relief valve as will be described.

The main valve 16, which includes the ball 64, which in turn is shown in greater detail in FIGURES 3, 4 and 5, has a body 66 with an upper shoulder 66a of spherical contour adapted to seat against a seat 65 on the sleeve 32. The ball 64 is constructed as follows: the body 66 is provided with a passageway 67 leading from an inlet 67a on a zone of its shoulder 66a, which normally falls within the seat 65, to an outlet 67b at the base of the body 66. The body 66 has a lower cylindrical part 66b, threaded to receive a cylindrical cap 69, and a shoulder 70 which the rim 72 of the cap 69 abuts. The lower part 66b has a bottom flat face 66c interrupted by an annular groove 66d. When in place, the bottom of the cap 69 is spaced from the bottom of the body 66 to provide a relief valve chamber 68 of relief valve 63.

The cap 69 has an upwardly extending internal boss 73 extending into the chamber 68 and having a flat upper surface. The lower end of the cap 69 has a downwardly extending guiding pin, guided within the guide recess 39.

A free disc 75 is placed within the chamber 68 for movement between an open position resting on the boss 73 to a closed position against the face 66c which serves as a valve seat. The body 66 is provided with one or more discharge passages 77 leading from the annular groove 66d to the surface 66a at a position between the normal surface which seats on the seat 65 and the shoulder 70. Preferably, the discharge passages 77 have, as shown, outlets directed towards the roof of the valve chamber 29 so that the stream of condensate leaving the outlet of passages 77, impinges against the roof of valve chamber 29.

OPERATION

During the warming up time, air and cold water are discharged through the trap and the bimetallic units 47 and 49 will be positioned to keep the main valve 16 open, i.e. the ball 64 removed from its seat 65 to allow uninterrupted flow through the trap (as shown in FIGURES 1 and 3).

The trap will remain open as long as steam does not enter the chamber 21 to bring the bimetallic units 47 and 49 to main valve-closing temperatures, and will thus allow condensate to escape freely. However, when steam enters by the chamber 21, the temperature of the steam will force the bimetallic units 47 and 49 to close the main valve 16. When condensate enters into the chamber, but the bimetallic units 47 and 49 have not yet had time to open the main valve 16, the condensate will flow through the passage 67, pushing the disc 75, of relief valve 63, away from the seat 66c. The condensate will then discharge into the annular seat groove 66d and through the discharge passages 77.

The condensate will leave the outlet of passages 77 in the form of a high velocity jet which impinges against the roof to the chamber 29. This action will apply a reaction force to the ball 64 tending to open the main valve 16 more quickly, thereby enhancing the sensitivity of the steam trap.

As steam follows the condensate through the passage 67, the high velocity of the radial jet across the top of the disc 75 creates a low pressure area (Bernouilli effect). The steam jet is deflected into the chamber 68 under the disc 75 where it builds up pressure by recompression and the pressure acts on the bottom surface of the disc 75 (FIGURE 5). Pressure in the chamber 68 acting on the full bottom surface area of the disc 75 exceeds the force of the incoming steam from passage 67 and of the low pressure area above the disc 75 and immediately forces it against the seat 66c closing the inlet passage 67.

As condensation is formed in the chamber 68, the pressure on the bottom surface of the disc 75 decreases and the disc 75 is pushed down by the pressure of the steam in the passage 67, completing a cycle. This cycle will repeat itself periodically while the steam trap is "on steam" allowing only a very small amount of steam to escape, which is negligible for practical trapping purposes.

If a condition prevails where there is steam and hot condensate close to steam temperature entering the steam trap, there being insufficient condensate to open the main valve, the relief valve 63 will remain open (as in FIGURES 2 and 4), allowing the condensate to escape even though the main valve is closed.

When condensate starts to come through the inlet 23 and before the bimetallic elements have had time to deflect the main valve (which is still in the closed position of FIGURES 2, 4 and 5) the condensate will pass down through the main passage 67 of the relief valve 63 and immediately outward through the outlet passage 77, there being no counterpressure on the disc 75 adequate to close the relief valve 63. So, the relief valve 63 will respond immediately to a change from steam to condensate even before the bimetallic elements have had time to react. The valve is thus considerably more sensitive than a valve employing a single response to condensate temperature.

It is to be noted that the relief valve is inoperative when the main valve 16 is open, thereby enhancing the life of the relief valve.

I claim:

1. A steam trap comprising a housing provided with an inlet and an outlet and communication therebetween, main valve means controlling said communication, temperature responsive valve actuating means adapted to close the main valve means at steam temperature and to open the main valve means at condensate temperature, and pressure responsive relief valve means between said inlet and outlet adapted to close under steam pressure and to open under condensate pressure.

2. A steam trap, as defined in claim 1, in which the relief valve means is integral with the main valve means, whereby it is inoperative when the main valve means is open.

3. A steam trap, as defined in claim 1, wherein the housing is provided with a chamber connected to the inlet having an outlet passage, the main valve means having a plug adapted to open and close said outlet passage, the temperature responsive valve actuating means being housed in the said chamber and being connected to the plug, said relief valve means being integral with the plug, and operates only when the main valve is closed.

4. A steam trap, as defined in claim 1, in which the housing is provided with a chamber connected to the inlet and having outlet passage means, and the main valve means and the relief valve means are arranged to independently prevent steam and to allow passage of condensate through said outlet passage means.

5. A steam trap, as defined in claim 1, wherein the housing includes an outlet passage between the inlet and the outlet, the temperature responsive means is a bimetallic assembly and the main valve means includes a ball valve operatively connected to the bimetallic assembly and adapted to open and close the outlet passage, said ball valve having a ball embodying a relief passage extending from said valve passage to the outlet, and the pressure responsive valve means is adapted to control the relief passage.

6. A steam trap, as defined in claim 1, in which the housing includes a main chamber connected to said inlet and a valve chamber connected to said outlet and a connecting passage leading from the main chamber to the valve chamber and terminating in said valve chamber with a seat, said temperature responsive valve actuating means includes bimetallic elements mounted on the housing within the main chamber, a ball valve stem operatively connected to said bimetallic elements and extending through said passage to the valve chamber, a ball on the end of said valve stem, said ball being provided with a spherical upper surface having a circular seating area and extending downwardly to include a relief valve chamber surrounding a substantially horizontal seat, said ball being provided with a pedestal centrally arranged and extending upwardly within said relief valve chamber opposed and spaced from said seat, a disc having a diameter less than that of the seat normally resting thereon, said ball body having an inlet passage leading from a zone in the spherical surface normally within said seating area of the ball to said horizontal seating surface, said ball body being provided with at least one discharge passage leading from said horizontal seating surface to a zone of the spherical surface normally outside the seating area, the disc being adapted normally to rest on said pedestal, but to be forced against the horizontal seating surface in accordance with the Bernouilli effect when steam pressure enters the inlet passage.

7. A steam trap as defined in claim 1, a main valve plug having a body provided with an upper surface having an upper circular seating area adapted to bear against a valve seat and a lower relief valve chamber and lower seating surface forming part of the roof of said relief valve chamber and a centrally arranged horizontal pedestal within the chamber having a surface opposite and parallel the lower seating surface and spaced therefrom, a disc of greater diameter than the pedestal resting thereon, said body being provided with an inlet passage extending from said upper surface inside said upper circular seating area and at least one discharge passage extending from said lower seating surface to said upper surface outside the upper circular seating area, the disc adapted normally to rest on the pedestal, but to be forced by the Bernouilli effect against the lower seating surface by steam pressure emerging from said inlet passage.

8. A main valve plug, as defined in claim 7, in which the body is made up of a symmetrical upper surface provided with a hemispherical head and a cylindrical trunk extending therefrom, a cap having a base spaced from the trunk and a skirt extending from the base to surround and engage the trunk and defines said chamber, the pedestal extending upwardly from the base, the head and trunk being provided with said passages.

References Cited

UNITED STATES PATENTS

| | | | |
|---|---|---|---|
| 2,793,814 | 5/1957 | Velan | 236—59 |
| 2,945,505 | 7/1960 | Hansen | 137—183 |
| 2,964,243 | 12/1960 | Jorgensen | 236—59 |
| 3,162,208 | 12/1964 | Curatola | 137—183 |

WILLIAM J. WYE, *Primary Examiner.*

U.S. Cl. X.R.

137—183